(12) United States Patent
Bezner

(10) Patent No.: US 7,819,209 B1
(45) Date of Patent: Oct. 26, 2010

(54) GUIDED TRANSPORT UNIT

(75) Inventor: William A. Bezner, Gainesville, TX (US)

(73) Assignee: Complete Production Services, Houston, TX (US)

(*) Notice: Subject to any disclaimer, the term of this patent is extended or adjusted under 35 U.S.C. 154(b) by 183 days.

(21) Appl. No.: 12/156,308

(22) Filed: May 31, 2008

(51) Int. Cl.
*B62D 51/06* (2006.01)

(52) U.S. Cl. .................... 180/8.1; 180/8.5; 180/8.6

(58) Field of Classification Search .......... 180/8.1, 180/8.5, 8.6
See application file for complete search history.

(56) References Cited

U.S. PATENT DOCUMENTS

| | | | |
|---|---|---|---|
| 1,001,299 A | 8/1911 | Page | |
| 3,576,225 A * | 4/1971 | Chambers | 180/8.5 |
| 3,921,739 A | 11/1975 | Rich et al. | |
| 4,288,177 A | 9/1981 | Schoonmade | |
| 5,921,336 A | 7/1999 | Reed | |
| 6,581,525 B2 * | 6/2003 | Smith | 104/96 |
| 7,604,075 B1 * | 10/2009 | Limbacher, Jr. | 180/8.5 |

* cited by examiner

*Primary Examiner*—Lesley Morris
*Assistant Examiner*—Marlon A Arce
(74) *Attorney, Agent, or Firm*—The Matthews Firm

(57) ABSTRACT

A guided transport unit and methods of guiding the transport unit for moving a superstructure in precise angular movements over a surface are disclosed. The guided transport unit comprises a skid pad, a vertical displacing member engaged with the skid pad, a base operatively associated with the vertical displacing member, and a directional actuator. The base includes a planar element for engaging the surface over which the superstructure is transported, and a carrier for moving the vertical displacing member and skid pad relative to the surface. The directional actuator controls and secures the relationship among the vertical displacing member, the base, and the skid pad for positioning the base in a predetermined direction to engage the surface, setting the carrier to move each skid pad in a predetermined direction across the planar element of the base, and repositioning the base in another direction for movement of the guided transport unit.

16 Claims, 9 Drawing Sheets

GUIDED TRANSPORT UNIT

TECHNICAL FIELD

The embodiments of the apparatus and methods relate generally to a guided transport unit for moving superstructures over a surface and including a directional actuator for predetermining angular settings to create and secure precise angular movements of the guided transport unit.

BRIEF BACKGROUND

In the operation of drilling multiple wells, it is not uncommon to disassemble a drilling rig so that it can be relocated to another drilling site. This disassembly and reassembly of the drilling rig requires an extended period of downtime and manpower, regardless of whether the next drilling site location is miles away or just a few feet from the original site. Furthermore, like any business operation, ability to minimize downtime and expenses and to increase production and profits are always desired.

Although manually-operated walking or moving structures are available in the industry, as disclosed in U.S. Pat. No. 5,921,336; U.S. Pat. No. 3,921,739; and U.S. Pat. No. 1,001,299, all of which are incorporated herein by reference, the manually-operated walking or moving structures do not employ a guidance system for aligning the walking substructures, changing directions in calculated angular movements, accurately and safely moving the walking rig in predetermined and precise angular movements, and maintaining, securing, and/or locking precise angular orientations. For example, walking structures for carrying a drilling rig, which have been used in the industry in the past, require each jack pad to be physically and manually measured to ensure proper orientation. In addition, the existing methods do not provide pre-determining and providing a uniform and precisely angular orientation and/or locking of the position of each jack pad while in movement. The misaligning of the jack pads can cause unwanted force on the structure and can cause damage to both the transport unit and the drilling rig that it is carrying.

SUMMARY OF THE INVENTION

The embodiments of the apparatus and methods relate generally to a guided transport unit for moving and securing superstructures or heavy equipment over a surface and include using a directional actuator for predetermining angular settings to create and secure the precise angular movements and/or changes in direction of the guided transport unit. The guided transport unit includes guided walking substructures that provide vertical and horizontal movement of the guided transport unit. The guided transport unit can change direction in precise angular movements by rotating the guided walking substructures in a variety of orientations.

The embodiments relate generally to a guided transport unit, that includes a skid pad, a vertical displacing member engaged with the skid pad, a base operatively associated with the vertical displacing member, and a directional actuator. The base includes a planar element for engaging the surface over which the superstructure is transported, and a carrier for moving the vertical displacing member and the skid pad relative to the surface. The directional actuator controls and secures the relationship among the vertical displacing member, the base, and the skid pads for positioning the base in a predetermined direction to engage the surface, setting the carrier to move each skid pad in the predetermined direction across the planar element of the base, and then repositioning the base in another direction for movement of the guided transport unit.

The embodiments of the methods for guiding the transport unit over a surface to move a superstructure can include the steps of rotating a plurality of guided walking substructures to a desired radial orientation about an axis, sliding a retaining member into the opening of a stationary support member and into an aligned opening on a guidance plate to maintain and secure or lock the guided walking substructure position and desired radial orientation, and lifting the guided transport unit by extending a vertical displacing member and thereby permitting each guided walking substructure to engage the surface. The method steps continue by shifting the transport unit horizontally to move the transport unit a desired precise angular movement and lowering the guided transport unit by retracting the vertical displacing member, thereby permitting each guided walking substructure to lift from the surface. The method can be completed by resetting or repositioning the guided walking substructures by retracting the horizontal movement cylinders on the guided walking substructures, and then repeating the steps to continue the guided movement of the transport unit over the surface.

Figure 1:
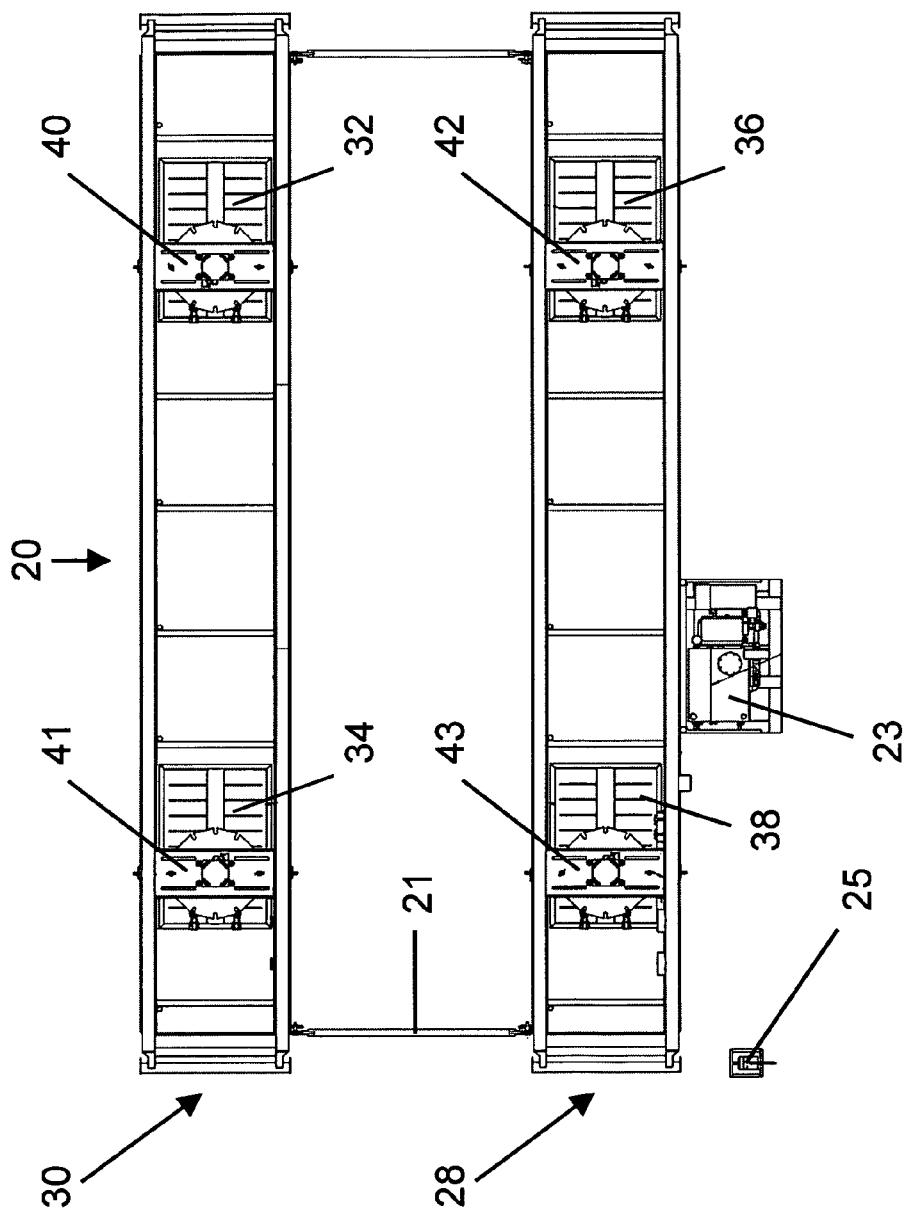
FIG. 1 depicts a top view of an embodiment of a guided transport unit.

The present embodiments are detailed below with reference to the listed Figures.

DETAILED DESCRIPTION OF THE EMBODIMENTS

For a further understanding of the nature and objects of the present invention, reference should be made to the following detailed description, taken in conjunction with the accompanying drawings. However, before explaining the present embodiments in detail, it is to be understood that the embodiments are not limited to the particular descriptions and that the embodiments can be practiced or carried out in various ways.

The embodiments of the apparatus and methods relate generally to a guided transport unit for moving superstructures or heavy equipment over a surface, such as a drilling rig, and include using a directional actuator or guidance system for predetermining angular settings to create precise angular movements of the guided transport unit and to secure desired angular positions and/or orientations of the guided transport unit.

Benefits of the present invention include precise angular movements of the guided transport unit for moving and transporting superstructures, such as a drilling rig, and the ability to easily change directions through the use of a directional actuator. The directional actuator can be calibrated to serve as a guidance system for predetermining angular settings that enable the guided transport unit and superstructure to move in precise angular movements, to maintain desired directions and orientations by securing the desired angular orientations and/or positions, and to minimize the potential for unwanted force caused by the misaligning of the guided walking substructures, which could compromise the structural integrity of the guided transport unit and cause damage or destruction to the transport unit and/or the superstructure.

In an embodiment, the guided transport unit includes at least one skid pad, a vertical displacing member engaged with at least one skid pad, a base operatively associated with the vertical displacing member, and a directional actuator that can function as a guidance system. Each base can include a planar element for engaging the surface over which the superstructure is transported, and can include a carrier for moving the vertical displacing member and the skid pad relative to the surface. The directional actuator can control and secure the relationship among the vertical displacing member, the base, and the skid pads for positioning the base in a predetermined direction to engage the surface. The directional actuator can set the carrier to move each skid pad in the predetermined direction, including precise angular movements, across the planar element of the base, and can reposition the base in another direction for guided movement of the transport unit. The directional actuator can secure, including to maintain and to lock, the desired precise angular orientations of guided transport unit by providing for the alignment of each walking substructure of the guided transport unit.

In an embodiment of the guided transport unit, the base and the directional actuator can form a guided walking structure, in which two or more walking structures are rotated in a desired direction to move, or horizontally displace, the guided transport unit. In the preferred embodiment, each guided walking substructure can be independently set for moving in precise angular movements or locked into place to secure the desired orientation by using the directional actuator of the guided transport unit. In an embodiment, the guided transport unit can include a pair of skid pads that support the vertical displacing member for raising and lowering the guided transport unit and can allow the guided walking substructures to move independently within the pair of skid pads. The pair of skid pads can be arranged parallel to each other. Alternatively, the skid pads can be a plurality of skid pads, arranged in various configurations, such as parallel or triangular configurations, for supporting the guided transport unit.

The guided transport unit, including the skid pads, vertical displacing member, and guided walking substructures can be constructed from metals such as steel. Various grades of steel can be used for constructing the guided transport unit, and the highest grades or strengths of steel can be used for constructing the foot pads of the guided walking substructures, of the guided transport unit.

In an embodiment of the guided transport unit, the directional actuator can include a guidance plate, that is rotatably connected to the axis of the vertical displacing member to allow a user to select an angle of rotation for the guided walking substructure by vertically aligning an opening on the guidance plate with an opening associated with the skid pad of the guided transport unit. This opening on the guidance plate is the opening for receiving a retaining member for setting the desired orientation and direction of the guided transport unit. This particular opening is one of a plurality of openings radially distributed about the guidance plate for receiving the retaining member and for securing the desired orientation of the guided walking substructure, and ultimately the desired direction of movement of the guided transport unit. Each opening on the guidance plate can be calibrated to a predetermined angular rotation for receiving the retaining member. Then, the retaining member can be vertically inserted into the opening in the guidance plate for aligning the guided walking substructure and for maintaining and/or securing the desired orientation relative to the walking structure. In an embodiment, the retaining member can be slidably inserted into the opening of a stationary support member located on each skid pad of the guided transport unit and, then, into one of the plurality of openings on the guidance plate for maintaining and/or securing the orientation of the walking structure. To further maintain and secure the orientation of the walking structure, the retaining member can include an opening for receiving at least one locking pin to prohibit the retaining member from exiting the opening in the guidance plate.

The use of the directional actuator, including the guidance plate and retaining member, allows the user to guide and operate the transport unit more safely and easier by having the ability to change the direction of each guided walking substructure, in precise angular movements, without having to guess or individually measure the angles for each guided walking substructure. This also ensures that each guided walking substructure is properly oriented to achieve the desired direction required for critical operation. Furthermore, the calibrated positioning and locking of each guided walking substructure to a desired position minimizes any unwanted force exerted on the chassis of the guided transport unit. For example, an unwanted force can result from a guided walking substructure that is not uniformly positioned with another guided walking substructure. Such an unwanted force can result in the destruction of the guided transport unit and the superstructure.

The guided walking substructures are integral to the operation of the apparatus as they provide the lateral, horizontal and angular movement of the guided transport unit. In an embodiment, each guided walking substructure can be rotatably connected to a vertical displacing member, which permits vertical movement of the guided transport unit. In an embodiment, a guided transport unit can include a plurality of vertical displacing members for longitudinal or vertical displacement of the guided transport unit relative to the ground. Each vertical displacing member can include a lower end and an upper end, in which the upper end includes a ring having a plurality of holes or openings to receive at least one ring retention bolt to secure the upper end of the vertical displacing member to a stationary support member and to maintain a static position relative to each skid pad for allowing the vertical displacing member to extend and retract. In an embodiment, the vertical displacing member can be a hydraulic vertical lift cylinder, and the guided transport unit can include four vertical lift cylinders for vertically extending and retracting the guided walking substructures. A motor, for example a deutz diesel 67 HP engine, can be used to provide the hydraulic power to lift all four vertical cylinders. For example, an engine can drive a hydraulic pump to pump fluid to a flow divider that evenly provides four separate flows of hydraulic fluid to four separate hydraulic valves, which can be used simultaneously to extend the four vertical lift cylinders. When the guided transport unit is vertically raised or extended to the desired vertical height, then the hydraulic fluid can be redirected to drive horizontal movement cylinders, located in the guided walking substructures, for allowing horizontal movement of the guided transport unit.

In an embodiment of the guided transport unit, the vertical displacing member can connect the guided walking substructures to the stationary support member, which is a fixed reference point on the chassis of the guided transport unit. The coordinated process of moving the guided transport unit requires the extension of the vertical displacing members, which force the guided walking substructure against the ground. The extension of the vertical displacing members cause the entire guided transport unit and attached superstructure, such as a drilling rig, to move in a vertical direction from ground level. As the guided transport unit is lifted off ground level, the guided walking substructures support the weight of the guided transport unit and the superstructure.

To permit horizontal movement, each guided walking substructure has a base that can include a receiving guide, which includes a pair of opposing walls connected to a plurality of individual rollers. A pair of horizontal movement cylinders, which can be hydraulically powered cylinders, can be used to connect to a foot pad to the receiving guide of the base of the guided walking substructures for extension and lateral movement. In an embodiment, a pair of horizontal movement cylinders are used for lateral movement of a guided walking substructure and include a first end and a second end. Each first end of the horizontal movement cylinders can be connected to a foot pad, and each second end of horizontal movement cylinder can be connected to a receiving guide of the base for retracting or extending to cause horizontal displacement of the guided transport unit with respect to a ground reference. The individual rollers, located on the receiving guide, slidably connect to a guided foot rail, which connects to the foot pad on the guided walking substructure for providing lateral motion of the guided transport unit.

After the desired horizontal distance has been accomplished or the threshold limits permitted by the length of the footpad have been achieved, each vertical displacing member can be retracted for lowering the guided transport unit onto the ground and allowing the chassis to rest on the ground as the guided walking substructures are lifted off the ground. This allows the horizontal movement cylinders to retract to their starting position, and allows the guided walking substructures to rotate to accommodate a change in direction. Next, the vertical displacing members can be retracted, which compresses the guided walking substructures to the surface and allows the guided transport unit to lift off the ground. The horizontal movement cylinders located on the guided walking substructures extend or retract to permit lateral movement defined by the use of the directional actuator for predetermining precise angular orientations and movements of the guided walking substructures. The method of movement of the guided transport unit can be repeated for moving a superstructure, for example moving a drilling rig from a first drilling site to a second drilling site.

In an embodiment of the method for moving a superstructure over a surface using a guided transport unit, the steps include rotating a base of the guided transport unit relative to the superstructure and, then, securing the base in a specific angular position by using a directional actuator. Securing the base can include locking or maintaining the base in a specific angular position or orientation. In an embodiment, the base and the directional actuator can form a guided walking substructure for movement of the superstructure. In an embodiment of the method, the directional actuator allows predetermined angular settings to create precise and specific angular movements for rotation, to a desired orientation and direction for each guided walking substructure. The method steps continue by engaging the base with the surface for supporting the superstructure, and moving the superstructure using the predetermined angular settings to create precise and specific angular movements relative to the base and over the surface. The desired angular orientation of each guided walking substructure can be maintained by slidably inserting a retaining member through an opening on a guidance plate of the directional actuator. Further, locking pins can be used to secure the retaining member that has been slidably inserted into the opening of the guidance plate. Next, the method steps include shifting the weight of the superstructure off of the base, and then continuing the steps for moving the superstructure over the surface in any direction as defined by the repeated placement of the base on the surface and the repeated selection of angled positions of the base.

With regard to the Figures, FIG. 1 depicts a top view of an embodiment of a guided transport unit 20, which includes a plurality of skid pads 28 and 30. The skid pads or units, 28 and 30, can be parallel to each other, and the structure of each skid pad 28 and 30 can include a plurality of stationary support members 40, 41, 42, 43, a plurality of beams and girders that makeup the framework of each skid pad 28 and 30, and a plurality of guided walking substructures 32, 34, 36, and 38, in which, in this embodiment, the guided walking substructures 36 and 38 are attached to skid pad 28 and the guided walking substructures 40 and 41 are attached to skid pad 30.

Each stationary support member 40, 41, 42, 43 can have an opening for receiving a retaining member for maintaining the desired orientation of the guided transport unit 20. Each skid pad 28 can include a power source 23, such as a hydraulic or electric motor, and controller 25 for driving directional actuators to vertically and horizontally displace the guided transport unit 20. In this embodiment of the guided transport unit, the skid pads can be retrofitted easily to support a variety of superstructures with varying widths by adjusting the length of spread beams 21. Each guided transport unit 20 includes a vertical displacing member, such as a vertical movement cylinder (See FIG. 5, vertical movement cylinder 24) for vertical movement of the guided transport unit 20. The guided walking substructures 32, 34, 36, and 38, include a base (See FIG. 5, base 50), and a directional actuator having a guidance plate (See FIG. 5, guidance plate 70) for predetermining angular settings to create precise angular movements and changes in direction of the guided walking substructures 32, 34, 36, and 38. This allows the plurality of guided walking substructures 32, 34, 36, and 38, to be rotated to desired radial orientations about an axis for desired movement over the surface, and to be secured in a desired precise orientation.

Figure 2:
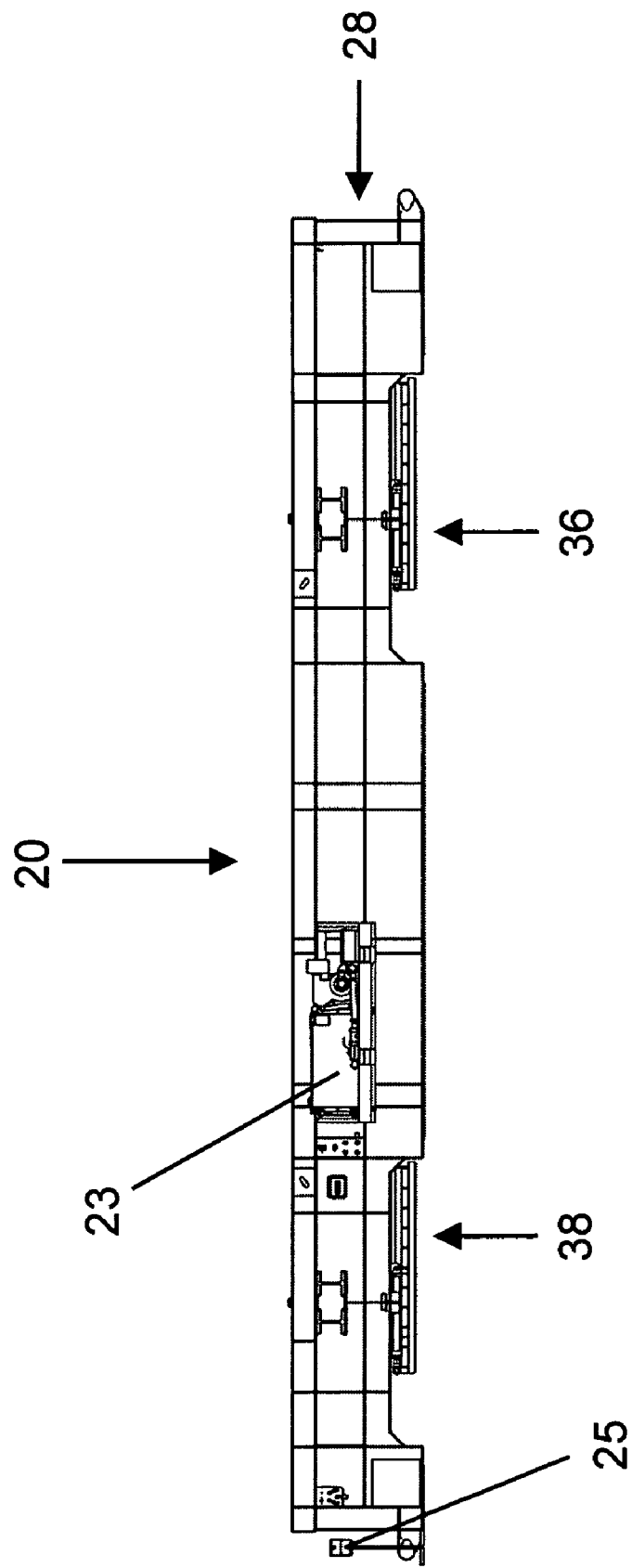
FIG. 2 depicts a side view of an embodiment of a guided transport unit.

FIG. 2 depicts a side view of an embodiment of a guided transport unit 20. The guided transport unit 20 houses and provides for the independent movement of each guided walking substructure 36 and 38, to permit the precise vertical, horizontal, and rotational movement of each guided walking substructure 36 and 38. Each skid pad 28 can include a power source 23, such as a hydraulic or electric motor, and a controller 25 for providing power to the directional actuator to guide the transport unit 20 over the surface.

Figure 3:
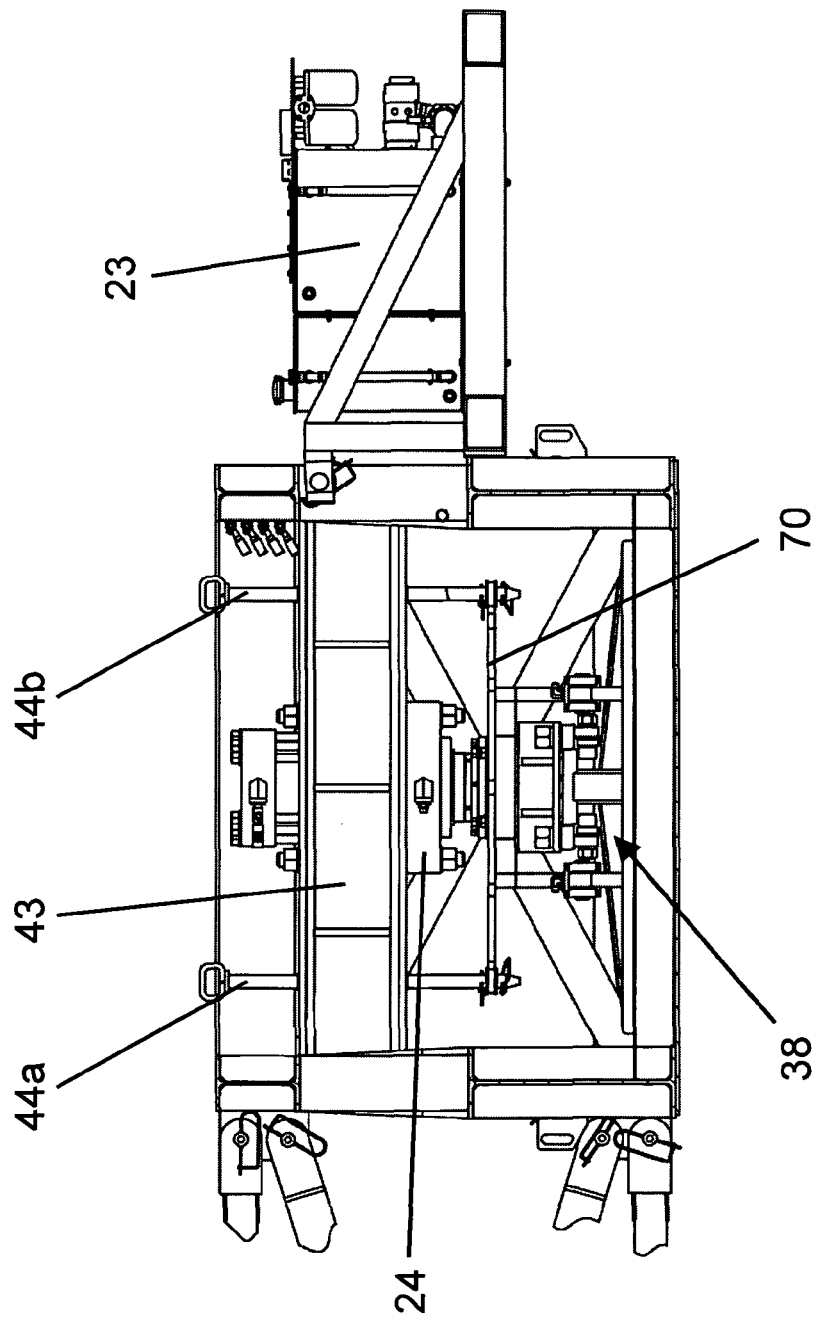
FIG. 3 depicts a front view of an embodiment of a guided walking substructure for moving a guided transport unit over a surface.

FIG. 3 depicts a front view of an embodiment of a guided walking substructure 38, for moving a guided transport unit 20 over a surface. In FIG. 3, the skid pad is at rest on the surface and the vertical movement cylinder 24 is in a retracted position, thereby suspending the guided walking substructure 38, to allow for a change in desired orientation. The vertical movement cylinder 24 can be mounted to a stationary support member 43, and rotatably connected to the guided walking substructure, 38, for vertical movement. Each guided walking substructure 38 comprises a directional actuator having a guidance plate 70, that includes a plurality of openings radially distributed about the guidance. Each opening can be calibrated to a predetermined angular rotation and can receive at least one retaining member, 44a and 44b, for aligning each guided walking substructure 38 and maintaining and securing a desired angular orientation, direction, and movement for each guided walking substructure 38.

Figure 4:
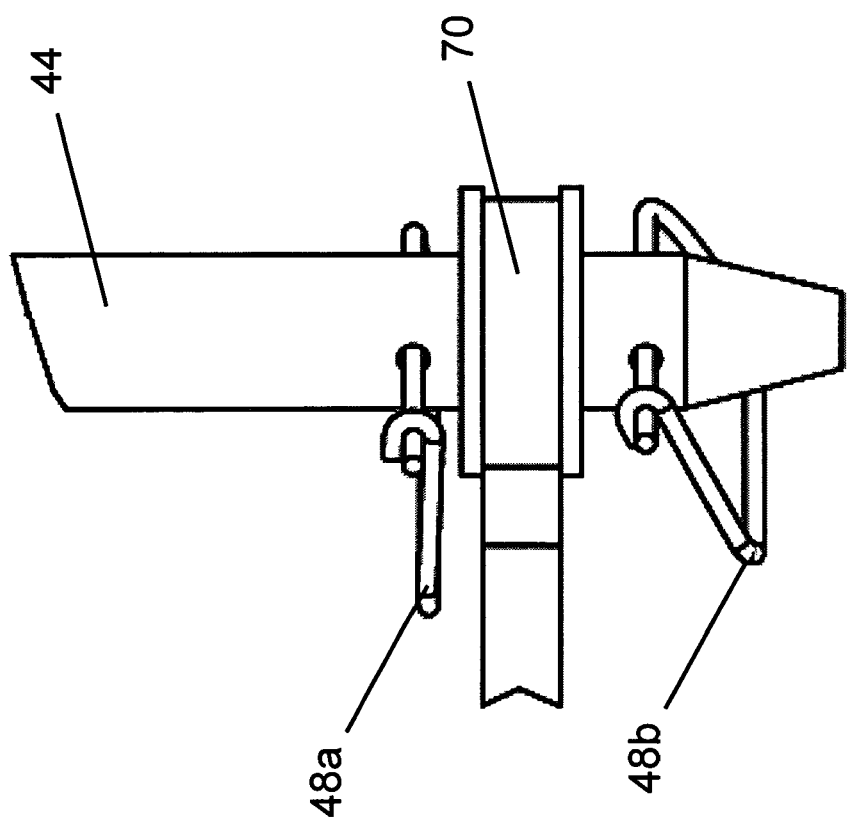
FIG. 4 depicts a side view of a lower portion of a retaining member for moving a guided transport unit over a surface.

To verify the angle of orientation of each guided walking substructure 38 and to insure it maintains that desired position during operation, at least one retaining member 44a and 44b can be slidably inserted through an opening on a stationary support member 43, and, then, through the opening on the guidance plate 70, which can be secured in place by one or more locking pins 48a and 48b, as shown in FIG. 4. The retaining members 44a and 44b do not interfere with the vertical movement of the guided walking substructure 38, but are designed to control rotational movement of the guided walking substructure 38. Each skid pad 28 can include a power source 23, such as a hydraulic or electric motor, used for powering the directional actuator and movement cylinders, such as the vertical movement cylinder 24 and/or the horizontal movement cylinders 52 and 54, as shown in FIG. 6, for guided movement of the transport unit 20.

FIG. 4 depicts a side view of a lower portion of a retaining member 44 for moving a guided transport unit over a surface. The retaining member 44 can be slidably inserted into an opening of a stationary support member and into an aligned opening on a guidance plate 70 of a directional actuator to secure the guided walking substructure position and desired radial orientation. Locking pins 48a and 48b can be inserted below and above the guidance plate 70 to insure that the retaining member 44 is not unintentionally removed. This will ensure the guided walking substructure maintains and secures its desired and precise angular orientation during operation.

Figure 5:
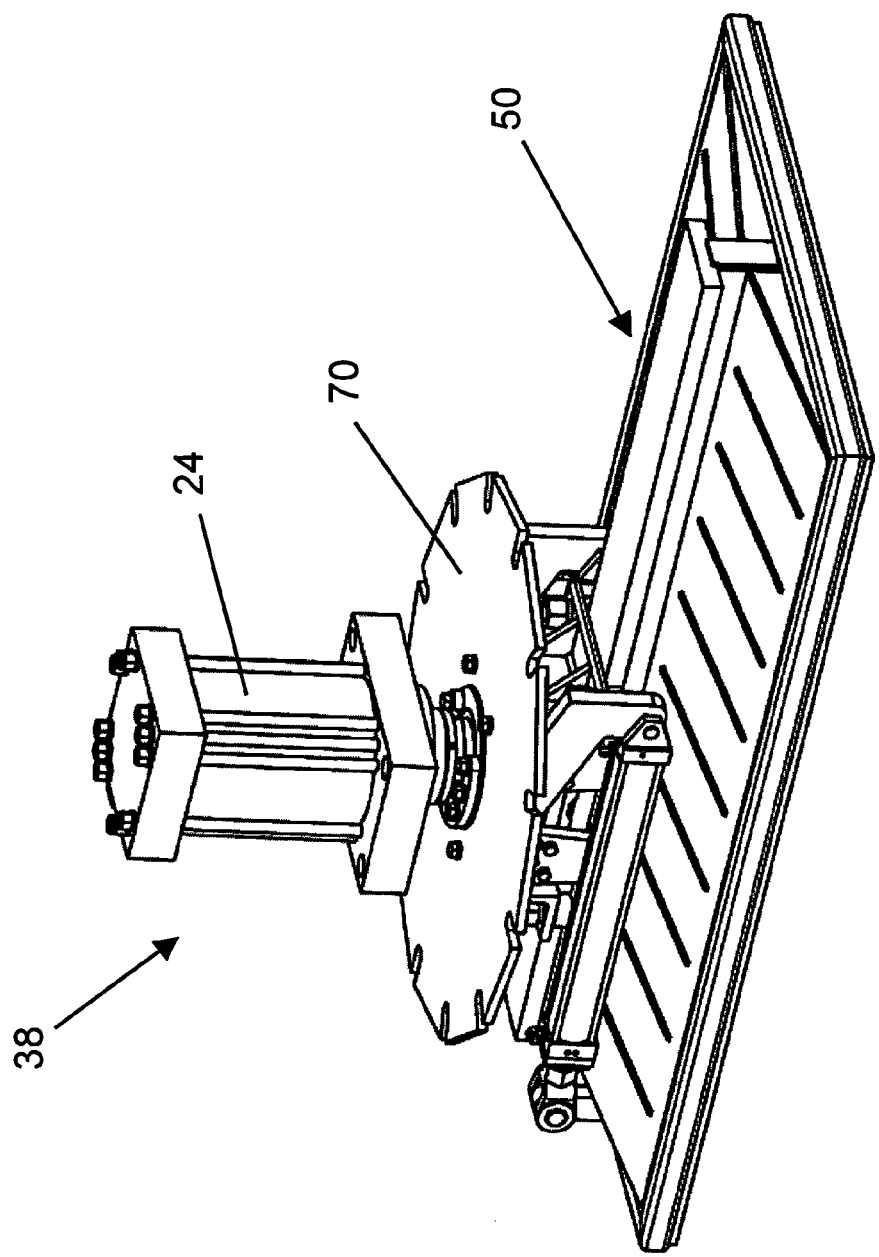
FIG. 5 depicts a side view of an embodiment of a guided walking substructure for a guided transport unit.

FIG. 5 depicts a side view of an embodiment of a guided walking substructure 38 for a guided transport unit 20. In FIG. 5, a vertical movement cylinder 24 lifts the guided transport unit 20 thereby permitting the guided walking substructures 38, to engage the surface. Each guided walking substructure 38 includes a base 50, and a directional actuator having a guidance plate 70, that can rotatably connect to the vertical movement cylinder 24 at one end and can connect to the base 50 on the other end.

Figure 6:
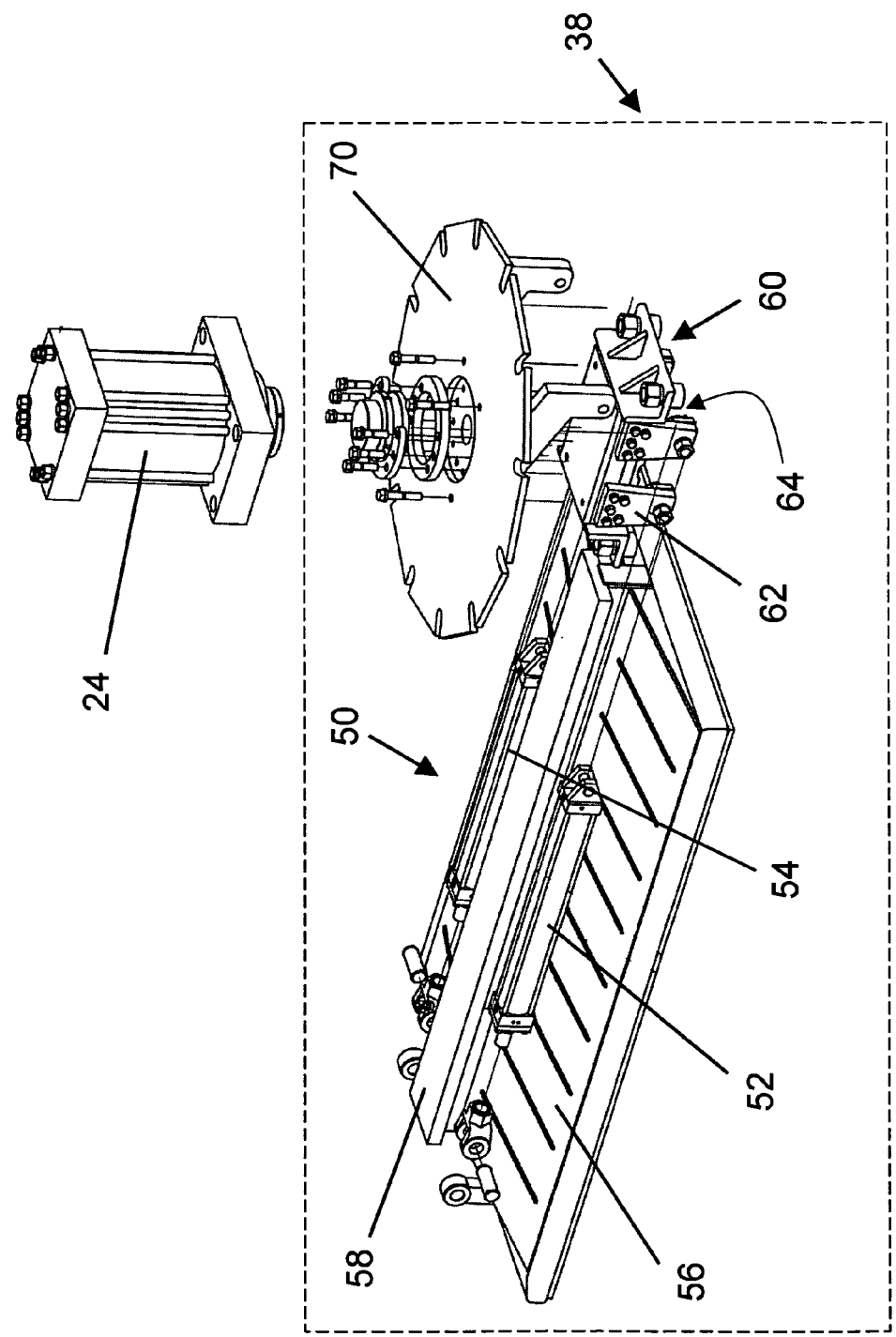
FIG. 6 depicts an embodiment of a guided walking substructure and vertical displacing member for moving a guided transport unit over a surface.

FIG. 6 depicts an embodiment of a guided walking substructure 38, and vertical displacing member 24, such as a vertical movement cylinder 24, for moving a guided transport unit 20 over a surface. The guided walking substructure 38 includes a directional actuator, that can include a guidance plate 70, and a base 50, which can include a receiving guide 60 that slidably connects to a guided foot rail 58 mounted on the top end of a planar element, such as a foot pad 56. The base 50 can provide longitudinal movement by slidably displacing the receiving guide 60, which includes a pair of opposing walls 62 connected to a plurality of individuals rollers 64, along the track of the guided foot rail 58. A pair of horizontal movement cylinders 52 and 54, such as hydraulic horizontal movement cylinders, can be used to shift the guided foot rails 58 of the base 50, and ultimately shift the weight of the guided transport unit 20 horizontally to move the guided transport unit 20 a desired and precise angular movement over the surface. In an embodiment, the distance traveled horizontally can be limited to the length of the foot pad 56.

Figure 7:
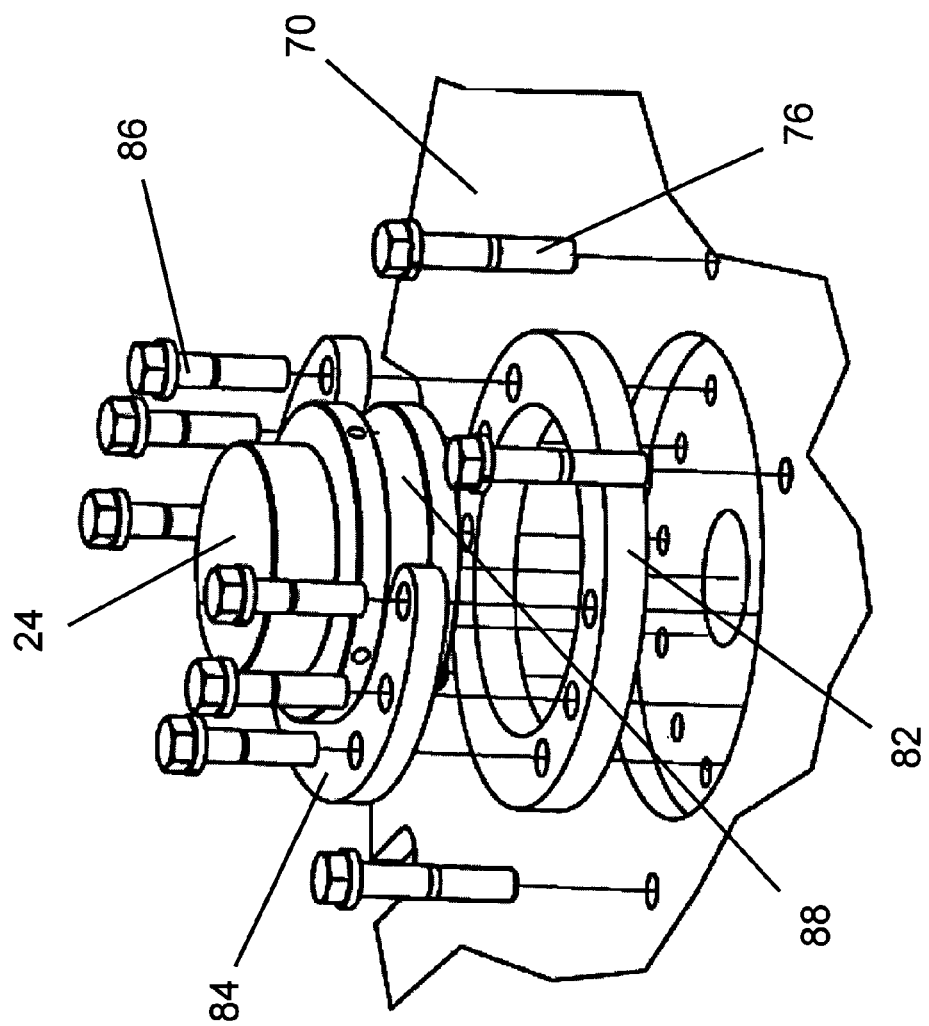
FIG. 7 depicts an embodiment of a vertical displacing member for use with a guided transport unit.

FIG. 7 depicts an embodiment of a vertical displacing member 24, such as a vertical movement cylinder 24, for vertical movement of a guided walking substructure 38, for moving the guided transport unit 20. In the embodiment, the vertical displacing member 24 includes an upper end that can include an open-ended swivel ring 84. The open-ended swivel ring 84 can freely rotate relative to a recessed ring 88, located on the vertical movement cylinder 24. The open-ended swivel ring 84 can include a plurality of openings for receiving a plurality of ring retention bolts 86 to secure the upper end of the vertical movement cylinder 24 to a stationary support member, in a static position and relative to a skid pad. This allows the vertical movement cylinder 24 to extend and retract, which can raise or lower the guided transport unit 20. Each ring retention bolt 86 can be slidably inserted into one of the plurality of openings in the open-ended swivel ring 84 and through one of a plurality of openings in an end swivel ring 82. The end swivel ring 82 can connect the open-ended swivel ring 84 of the vertical movement cylinder 24 to a guidance plate 70 of a directional actuator, which can be held into place by a plurality of plate retention bolts 76. The plurality of plate retention bolts 76 can connect the guidance plate 70 to a base 50 (See FIG. 6), which allows the guided walking substructure 38 (See FIG. 6) to freely rotate relative to the vertical movement cylinder 24.

Figure 8:
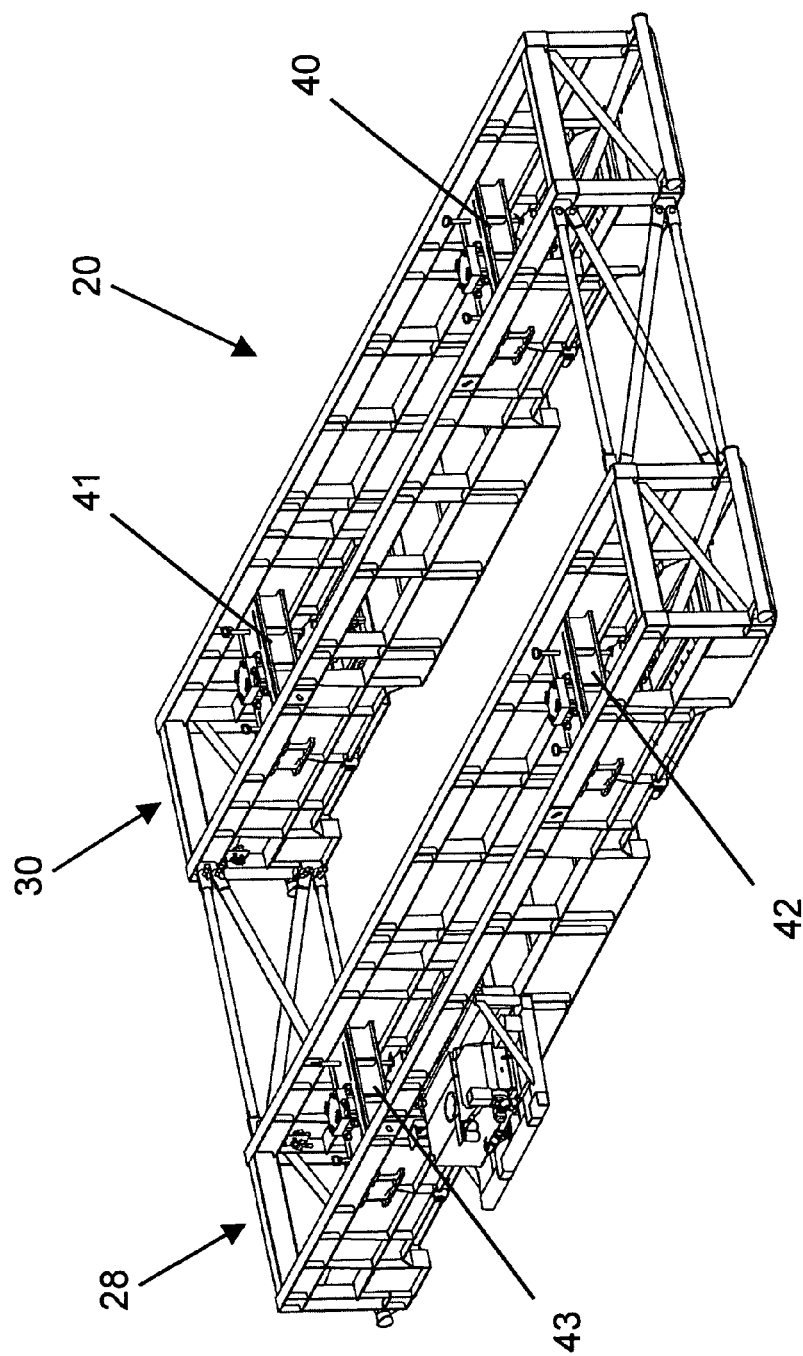
FIG. 8 depicts an embodiment of a guided transport unit.

FIG. 8 depicts an embodiment of a guided transport unit 20, which includes a pair of skid pads 28 and 30. Skid pad 28 includes two stationary support members 42 and 43, and skid pad 30 includes two stationary support members 40 and 41.

Figure 9:
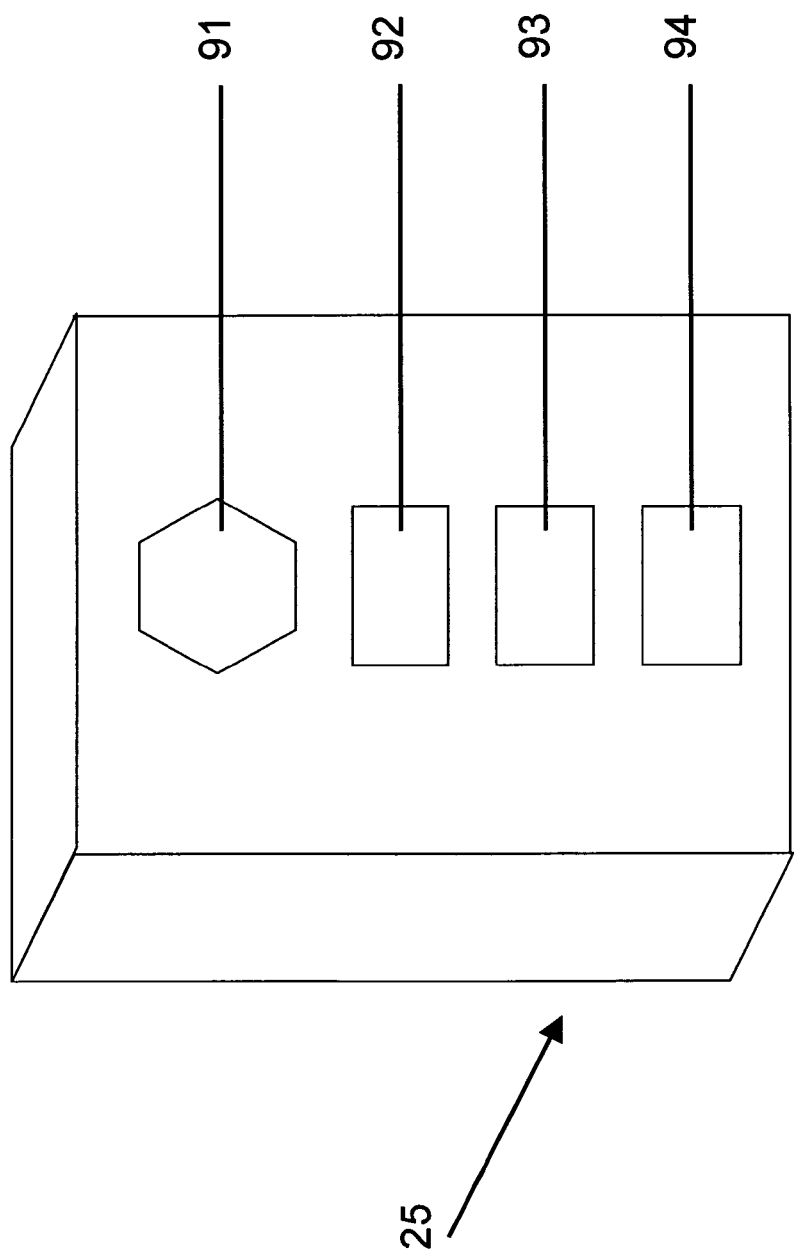
FIG. 9 depicts an embodiment of a control box for use with a guided transport unit.

FIG. 9 depicts a control box 25 that can be used with a guided transport unit 20 to control the precise movements of the transport unit 20. The control box 25 can be located remotely to the guided transport unit for remote operation, such as by wireless connection or network, or can be located on the guided transport unit. The control box 25 can include an emergency control 91, such as an emergency button, for ceasing all movement of the guided transport unit, as a safety precaution. The control box 25 can include a motor speed control 92 for accelerating the speed or decreasing the speed of the guided walking substructures. The control box 25 can include a horizontal movement control 93 for control of the horizontal movement cylinders and a vertical movement control 94 for control of the vertical movement cylinders. Additional controls of the guided transport unit are provided by internal controls located within the control box 25.

While these embodiments have been described with emphasis on the embodiments, it should be understood that within the scope of the appended claims, the embodiments might be practiced other than as specifically described herein.

What is claimed is:

1. A guided transport unit for moving a superstructure over a surface, wherein the guided transport unit comprises:
   (a) a pair of skid pads;
   (b) a vertical displacing member engaged with an at least one of the pair of skid pads;
   (c) a base operatively associated with the vertical displacing member, wherein the base comprises:
      (1) a planar element for engaging the surface over which the superstructure is transported; and
      (2) a carrier for moving the vertical displacing member and the at least one of the pair of skid pads relative to the surface; and
   (d) a directional actuator for controlling and securing the relationship among the vertical displacing member, the base, and at least one of the pair of skid pads,
   wherein the at least one of the skid pads engaged with the vertical displacing member is configured to support the vertical displacing member for raising and lowering the guided transport unit, and is also configured to allow one or more guided walking substructures to move independently within the at least one of the skid pads, and wherein the pair of skid pads further comprise a plurality of stationary support members having an opening for receiving a retaining member.

2. The guided transport unit of claim 1, wherein the base and the directional actuator form one or more of the guided walking substructures.

3. The plurality of stationary support members of claim 1, wherein each stationary support member comprises a plurality of first openings to receive at least one retaining member and at least one locking pin and a second opening to receive the vertical displacing member.

4. The guided transport unit of claim 1, wherein the vertical displacing member comprises an upper end and a lower end, wherein the upper end comprises a ring having a plurality of openings to receive a plurality of retention bolts to secure the upper end of the vertical displacing member to a stationary support member in a static position relative to each skid pad.

5. The guided transport unit of claim 1, wherein each directional actuator comprises a guidance plate that is rotatably connected to the axis of the vertical displacing member to allow a user to select an angle of rotation by vertically aligning an opening on the guidance plate with an opening associated with the skid pad, wherein the opening on the guidance plate is the opening for receiving a retaining member for setting a desired orientation and direction of the guided transport unit.

6. The guided transport unit of claim 5, wherein each guidance plate comprises a plurality of openings for receiving at least one retaining member for securing the desired orientation of the one or more guided walking substructures, wherein the plurality of openings are radially distributed about the guidance plate.

7. The guided transport unit of claim 6, wherein the guidance plate comprises a plurality of openings that are calibrated to a predetermined angular rotation for receiving the retaining member, wherein the retaining member is vertically inserted into the opening in the guidance plate for aligning the one or more guided walking substructures and for securing the desired orientation relative to the one or more guided walking structures.

8. The guided transport unit of claim 7, wherein the retaining member is slidably inserted into one of the openings of the stationary support member and into one of the plurality of openings on the guidance plate for securing the orientation of the one or more guided walking substructures.

9. The guided transport unit of claim 8, wherein the retaining member comprises an opening for receiving at least one locking pin to prohibit the retaining member from exiting the opening in the guidance plate.

10. The guided transport unit of claim 1, wherein the guided transport unit comprises a plurality of vertical displacement members for longitudinal displacement of the guided transport unit relative to the surface.

11. The guided transport unit of claim 1, wherein the one or more guided walking substructures are configured for horizontally displacing the guided transport unit.

12. The guided transport unit of claim 1, wherein the base comprises a receiving guide for slidably engaging a guided foot rail, wherein the guided foot rail is connected to a foot pad.

13. The guided transport unit of claim 12, wherein the receiving guide comprises a pair of opposing walls connected to a plurality of individual rollers, wherein the plurality of individual rollers slidably connect to the guided foot rail.

14. A method for moving a superstructure over a surface using a guided transport unit, wherein the method comprises:
(a) rotating a base relative to the superstructure;
(b) securing the base in a specific angled position using a directional actuator;
(c) engaging the base with the surface for supporting the superstructure;
(d) moving the superstructure using predetermined angular settings to create precise angular movements relative to the base and over the surface;
(e) shifting the weight of the superstructure off of the base, and continuing the steps for moving the superstructure over the surface in any direction as defined by the repeated placement of the base on the surface and the repeated selection of angled positions of the base;
(f) moving the superstructure using predetermined angular settings to create precise angular movements by rotating and securing a guided walking structure to a desired orientation; and
(g) securing the desired orientation of each guided walking structure by inserting a retaining member through an opening on a guidance plate of the directional actuator.

15. The superstructure of claim 14, wherein the base and the directional actuator form a guided walking substructure for moving the superstructure.

16. A method to guide a transport unit over a surface, wherein the steps of the method comprise:
(a) rotating a plurality of guided walking substructures, wherein each guided walking substructure is rotated to a desired radial orientation about an axis;
(b) sliding a retaining member into an opening of a stationary support member and into an aligned opening on a guidance plate to secure each guided walking substructure position and desired radial orientation;
(c) lifting the guided transport unit by extending a vertical displacing member thereby permitting each guided walking substructure to engage the surface;
(d) shifting the guided transport unit horizontally to move the guided transport unit a desired precise angular movement;
(e) lowering the guided transport unit by retracting the vertical displacing member thereby permitting each guided walking substructure to lift from the surface; and
(f) resetting each guided walking substructure by retracting the horizontal movement cylinders on the guided walking substructure.

* * * * *